(12) United States Patent
Kashima

(10) Patent No.: US 9,971,163 B2
(45) Date of Patent: May 15, 2018

(54) TRANSPARENT DISPLAY DEVICE

(71) Applicant: BOE TECHNOLOGY GROUP CO., LTD., Beijing (CN)

(72) Inventor: Miki Kashima, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 261 days.

(21) Appl. No.: 14/437,171

(22) PCT Filed: Sep. 20, 2014

(86) PCT No.: PCT/CN2014/086996
§ 371 (c)(1),
(2) Date: Apr. 20, 2015

(87) PCT Pub. No.: WO2015/149487
PCT Pub. Date: Oct. 8, 2015

(65) Prior Publication Data
US 2016/0246064 A1 Aug. 25, 2016

(30) Foreign Application Priority Data

Apr. 2, 2014 (CN) .......................... 2014 1 0132263

(51) Int. Cl.
G09F 13/04 (2006.01)
G02B 27/14 (2006.01)
G02F 1/1335 (2006.01)

(52) U.S. Cl.
CPC ..... *G02B 27/144* (2013.01); *G02F 1/133555* (2013.01); *G02F 2001/133557* (2013.01); *G02F 2001/133567* (2013.01)

(58) Field of Classification Search
CPC .......... G09F 13/04; G09F 13/08; G09F 13/10
(Continued)

(56) References Cited

U.S. PATENT DOCUMENTS 6,231,200 B1* 5/2001 Shinohara ............ G02B 6/0016
362/23.15
9,029,945 B2* 5/2015 Ryu ..................... H01L 29/0696
257/341
(Continued)

FOREIGN PATENT DOCUMENTS

CN 2731472 Y 1/1956
CN 1492267 A 4/2004
(Continued)

OTHER PUBLICATIONS

Mar. 16, 2016—(CN)—Second Office Action Application 201410132263.8 with English Tran.
(Continued)

*Primary Examiner* — Edwyn Labaze
(74) *Attorney, Agent, or Firm* — Banner & Witcoff, Ltd.

(57) ABSTRACT

Disclosed is a transparent display device, comprising a transparent display panel comprising a plurality of display regions configured to display information and a plurality of light transmitting regions configured to achieve transparent display; and a unidirectional viewing glass located at a light incident side of the transparent display panel and disposed to be opposite to the transparent display panel. The unidirectional viewing glass comprises a glass plate and a coating film formed on a surface of the glass plate at a side thereof. The above transparent display device provides different display modes.

19 Claims, 2 Drawing Sheets

(58) Field of Classification Search
USPC .................................. 362/97.1, 97.2, 97.4
See application file for complete search history.

(56) References Cited

U.S. PATENT DOCUMENTS

| | | | |
|---|---|---|---|
| 2005/0134142 A1* | 6/2005 | Yetter | B06B 1/0622 310/311 |
| 2005/0140927 A1* | 6/2005 | Aeling | B44C 3/02 353/30 |
| 2006/0186803 A1* | 8/2006 | Lim | H01L 51/5281 313/506 |
| 2008/0290784 A1* | 11/2008 | Arbab | G02B 6/0035 313/498 |
| 2009/0071082 A1* | 3/2009 | Van Der Kort | E06B 9/11 52/202 |
| 2010/0026792 A1* | 2/2010 | Niyomura | G02B 27/26 348/54 |
| 2012/0098875 A1* | 4/2012 | Shinkai | G02B 6/0036 345/690 |
| 2013/0040052 A1 | 2/2013 | Akita et al. | |
| 2013/0044138 A1 | 2/2013 | Koga | |
| 2013/0046594 A1 | 2/2013 | Davidson | |
| 2013/0207099 A1 | 8/2013 | Shu et al. | |
| 2015/0086790 A1* | 3/2015 | Kim | H01B 1/24 428/412 |
| 2016/0231626 A1* | 8/2016 | Kodera | G02F 1/133711 |
| 2017/0025642 A1* | 1/2017 | Li | H01L 51/5271 |

FOREIGN PATENT DOCUMENTS

| | | |
|---|---|---|
| CN | 2684221 Y | 3/2005 |
| CN | 1841482 A | 10/2006 |
| CN | 101279821 A | 10/2008 |
| CN | 201181563 Y | 1/2009 |
| CN | 101615370 A | 12/2009 |
| CN | 102306075 A | 1/2012 |
| CN | 102593311 A | 7/2012 |
| CN | 302071945 S | 9/2012 |
| CN | 102763055 A | 10/2012 |
| CN | 203325361 U | 12/2013 |
| CN | 103489373 A | 1/2014 |
| CN | 103943033 A | 7/2014 |
| EP | 0824859 B1 | 2/1998 |
| EP | 1644772 A2 | 4/2006 |
| EP | 2477954 A1 | 7/2012 |
| WO | 9418694 A1 | 8/1994 |

OTHER PUBLICATIONS

Aug. 11, 2015—(CN)—First Office Action Appn 201410132263.8 with Eng Tran.
Dec. 31, 2014—International Search Report Appn PCT/CN2014/086996 and English Tran.

* cited by examiner

TRANSPARENT DISPLAY DEVICE

The application is a U.S. National Phase Entry of International Application No. PCT/CN2014/086996 filed on Sep. 20, 2014, designating the United States of America and claiming priority to Chinese Patent Application No. 201410132263.8 filed on Apr. 2, 2014. The present application claims priority to and the benefit of the above-identified applications and the above-identified applications are incorporated by reference herein in their entirety.

TECHNICAL FILED

Embodiments of the present invention relate to a transparent display device.

BACKGROUND

Transparent display technology allows displaying information on a display screen when applied with a voltage and viewing real objects behind the display screen when no voltage is applied.

Although transparent display devices adopting the above transparent display technology have been more and more widely used in various fields, the display mode thereof is still limited to a single one.

SUMMARY

Embodiments of the present invention provide a transparent display device having multiple display modes, thereby improving display diversity of the transparent display device.

At least one embodiment of the present invention provides 1. A transparent display device, comprising: a transparent display panel comprising a plurality of display regions configured to display information and a plurality of light transmitting regions configured to achieve transparent display; and an unidirectional viewing glass located at a light incident side of the transparent display panel and disposed to be opposite to the transparent display panel, wherein the unidirectional viewing glass comprises a glass plate and a coating film formed on a surface of the glass plate at a side thereof.

In an example of the present invention, the above transparent display device further comprising a light source disposed between the transparent display panel and the unidirectional viewing glass.

In an example of the present invention, the coating film covers an entire surface of the glass plate.

In an example of the present invention, the coating film comprises a first film layer covering the surface of the glass plate at a side thereof and a second film layer located at a side of the first film layer facing away from the glass plate; the second film layer has hollowed-out structures in one-to-one correspondence with the light transmitting regions of the transparent display panel.

In an example of the present invention, the first film layer has a thickness of 2700~3300 Å, and the second film layer has a thickness larger than or equal to 18000 Å.

In an example of the present invention, the first film layer has a thickness of 3000 Å, and the second film layer has a thickness of 20000 Å.

In an example of the present invention, the transparent display panel comprises a plurality of pixel units arranged in an array, each of the pixel units comprises: a red sub-pixel unit, a green sub-pixel unit, and a blue sub-pixel unit which are configured for displaying so as to form the display region; and a white sub-pixel unit configured for transmitting light so as to form the light transmitting region; wherein, the coating film has hollowed-out structures in one-to-one correspondence with the white sub-pixel units.

In an example of the present invention, the coating film is an aluminum film or a silver film.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

The inventor has noticed that the transparent display device having a single display mode cannot satisfy customer demands in diverse display modes for transparent display device.

Figure 1:
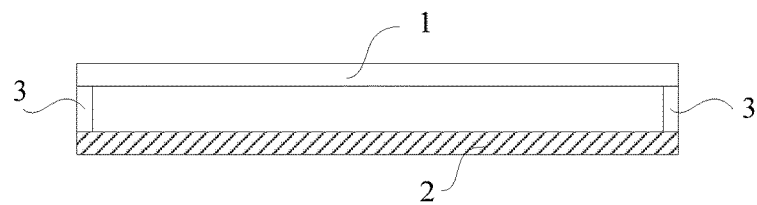
FIG. 1 is a schematic diagram illustrating a structure of a transparent display device as provided by an embodiment of the present invention.
Figure 2:
FIG. 2 is a schematic diagram illustrating a structure of an unidirectional viewing glass in the transparent display device as provided by an embodiment of the present invention.

FIG. 1 is a schematic diagram illustrating a structure of a transparent display device as provided by an embodiment of the present invention; and FIG. 2 is a schematic diagram illustrating a structure of an unidirectional viewing glass in the transparent display device as provided by an embodiment of the present invention;

As shown in FIG. 1 and FIG. 2, the transparent display device as provided by the embodiment of the present invention comprises a transparent display panel 1 and a unidirectional viewing glass 2.

The transparent display panel 1 has a plurality of display regions configured to display information and a plurality of light transmitting regions configured to achieve transparent display; the unidirectional viewing glass 2 is located at a light incident side of the transparent display panel 1 and disposed to be opposite to the transparent display panel 1; and the unidirectional viewing glass 2 comprises a glass plate 21 and a coating film formed on a surface of the glass plate 21 at a side thereof; an example of the coating film is shown in FIG. 2 by a coating film 22.

In an embodiment of the present invention, the above transparent display device can further comprise a light source 3 disposed between the transparent display panel 1 and the unidirectional viewing glass 2.

The unidirectional viewing glass 2 is characterized in that it functions as a mirror or almost as a mirror when viewed from a side of the unidirectional viewing glass 2 with a higher brightness to another side of the unidirectional viewing glass 2 with a lower brightness, and functions as a transparent glass or almost as a transparent glass when viewed from a side of the unidirectional viewing glass 2 with a lower brightness to another side of the unidirectional viewing glass 2 with a higher brightness.

When the above transparent display device operates under good ambient light illumination, a side of the unidirectional viewing glass 2 of the transparent display device facing to the transparent display panel 1 is shade by the transparent display panel 1; a light intensity at a side of the unidirectional viewing glass 2 facing away from the transparent display panel 1 is higher than that at a side of the unidirectional viewing glass 2 facing to the transparent display panel 1 due to an influence of the transparent display panel 1 in light transmittance. Among light rays incident on the side of the unidirectional viewing glass 2 facing away from the transparent display panel 1, a portion thereof is reflected by the coating film of the unidirectional viewing glass 2, and another portion thereof passes through the coating film of the unidirectional viewing glass 2 to transmit towards the transparent display panel 1. Among the light rays passing through the unidirectional viewing glass 2 and irradiating onto the transparent display panel 1, a portion thereof is incident into the display regions of the transparent display panel 1 to provide the display regions of the transparent display panel 1 with display light rays for information display, and another portion thereof irradiates into the light transmitting regions of the transparent display panel 1 and directly passes through the light transmitting regions so as to pass through the transparent display panel 1 and achieve transparent display of the transparent display panel 1. Moreover, among the light rays incident on the side of the transparent display panel 1 facing away from the unidirectional viewing glass 2, a portion thereof can pass through the transparent display panel 1 to irradiate onto the unidirectional viewing glass 2; and among the light rays irradiating onto the unidirectional viewing glass 2, a portion thereof is reflected by the coating film of the unidirectional viewing glass 2 and then transmits towards the transparent display panel 1 for information display or transparent display of the transparent display panel. Therefore, when a viewer is standing at the side of the unidirectional viewing glass 2 of the transparent display device facing away from the transparent display panel 1, the transparent display device provides the viewer with a mirror function; when the viewer is standing at the side of the transparent display panel 1 of the transparent display device facing away from the unidirectional viewing glass 2, the unidirectional viewing glass 2 provides a transparent display effect which allows the viewer observing both the information displayed on the transparent display panel 1 and objects disposed at a unidirectional viewing glass 2 side of the transparent display device via the unidirectional viewing glass 2.

Therefore, the above transparent display device as provided by the embodiments of the present invention has multiple display modes, which can improve a diversity in display mode of a transparent display device and can satisfy customer's demands.

According to an embodiment of the present invention in which the transparent display device further comprises a light source 3, when the above transparent display device operates under poor ambient light illumination, the light source 3 disposed between the unidirectional viewing glass 2 and the transparent display panel 1 is turned on to emit light rays with a brightness higher than that of ambient light so that a light brightness at the side of the unidirectional viewing glass 2 facing to the transparent display panel 1 is higher than a light brightness at the side of the unidirectional viewing glass 2 facing away from the transparent display panel 1. As a result, when standing at the transparent display panel 1 side of the transparent display device, the viewer is able to observe the information displayed on the transparent display panel 1 but is not able to observe the objects disposed at the unidirectional viewing glass 2 side of the transparent display device; and when standing at the unidirectional viewing glass 2 side of the transparent display device, the viewer is able to observe the objects disposed at the side of the transparent display panel 1 of the transparent display device facing away from the unidirectional viewing glass 2 via the unidirectional viewing glass 2 and the transparent display panel 1.

Therefore, the above transparent display device as provided by embodiments of the present invention has different display modes under different ambient light illumination, which further improves a diversity in display mode of the transparent display device and satisfies customer's demands.

As for the unidirectional viewing glass 2 in the transparent display device provided by embodiments of the present invention, the coating film is arranged on the glass plate 21 in various manners without limiting to those described in the embodiments of the present invention.

The First Example

As shown in FIG. 2, the coating film disposed on the glass plate 21 is a coating film 22 covering the entire surface of the glass plate 21. The unidirectional viewing glass 2 with the above structure has an excellent reflectivity so as to provide the transparent display panel with more light rays for display, thus improving a display effect of the transparent display panel.

The Second Example

Figure 3:
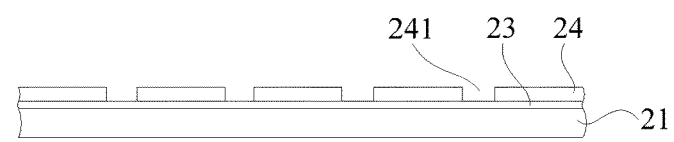
FIG. 3 is a schematic diagram illustrating another structure of the unidirectional viewing glass in the transparent display device as provided by an embodiment of the present invention.
Figure 4:
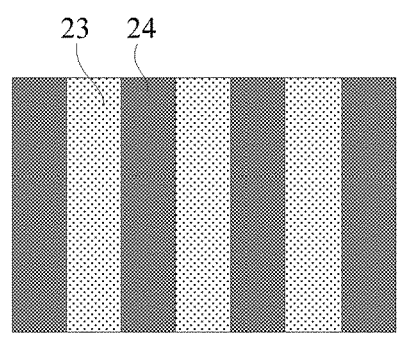
FIG. 4 is a schematic diagram illustrating a distribution of a coating film in a unidirectional viewing glass having the structure as shown in FIG. 3.

As shown in FIG. 3 and FIG. 4, the coating film coated on the glass plate 21 can comprise a first film layer 23 covering a surface of a side of the glass plate 21 and a second film layer 24 disposed at a side of the first film layer 23 facing away from the glass plate 21; the second film layer 24 comprises hollowed-out structures 241 in one-to-one correspondence with the light transmitting regions of the transparent display panel 1.

In the unidirectional viewing glass 2 with the above structure, the second film layer 24 has a higher transmittance at the regions of the hollowed-out structures 241, thereby improving a light transmittance of the entire transparent display device for better transparent display performance of the transparent display device.

For example, the above first film layer 23 has a thickness of 2700~3300 Å, for example, 2700 Å, 2800 Å, 2900 Å, 3000 Å, 3100 Å, 3200 Å, 3300 Å, etc.

For example, the above second film layer 24 has a thickness larger than or equal to 18000 Å, for example, 18000 Å, 19000 Å, 19500 Å, 20000 Å, 20500 Å, 21000 Å, 22000 Å, etc.

For example, the above first film layer 23 has a thickness of 3000 Å and the above second film layer 24 has a thickness of 20000 Å.

The Third Example

Figure 5:
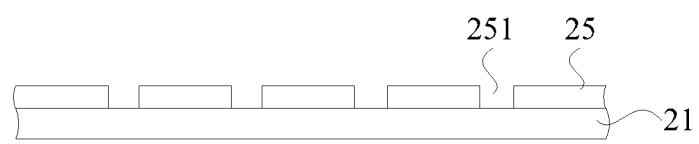
FIG. 5 is a schematic diagram illustrating still another structure of the unidirectional viewing glass in the transparent display device as provided by an embodiment of the present invention.
Figure 6:
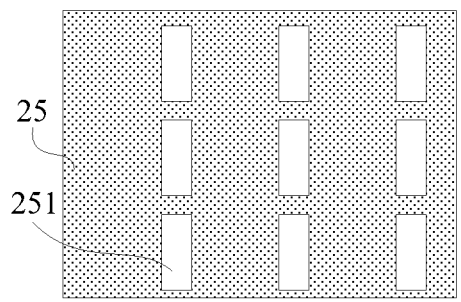
FIG. 6 is a schematic diagram illustrating a distribution of a coating film in a unidirectional viewing glass having the structure as shown in FIG. 5.

As shown in FIG. 5 and FIG. 6, in the transparent display device, the transparent display panel 1 comprises a plurality of pixel units arranged in an array, each of the pixel units comprises a red sub-pixel unit, a green sub-pixel unit and a blue sub-pixel unit which are configured for displaying so as to form a display region of the transparent display panel 1, and a white sub-pixel unit configured for transmitting light so as to form a light transmitting region of the transparent display panel 1. The coating film arranged on the glass plate 21 of the unidirectional viewing glass 2 is a coating film 25 having hollowed-out structures 251 in one-to-one correspondence with the white sub-pixel units.

Such unidirectional viewing glass 2 has an excellent transparent effect and meanwhile maintains a certain reflectivity and mirror-like effect.

For example, in the unidirectional viewing glass 2 of the transparent display device as provided by an embodiment of the present invention, the coating film on the glass plate 21 is an aluminum film or a silver film, but embodiment of the present invention is not limited thereto.

For example, the above transparent display device as provided by the embodiments of the present invention is a transparent advertising board.

Obviously, various variations and modifications can be made to the embodiments of the present invention by those skilled in the art without departing from the spirit and scope of the present invention, and such variations and modifications shall fall in the scope of the present invention as defined by the appended claims and equivalent thereof which is intending to incorporate the same.

The present application claims the priority of China patent application No. 201410132263.8 filed on Apr. 2, 2014, which is incorporated herein by reference in its entirely.

What is claimed is:

1. A transparent display device, comprising:
a transparent display panel comprising a plurality of display regions configured to display information and a plurality of light transmitting regions configured to achieve transparent display which allows viewing real objects behind the transparent display panel when no voltage is applied; and
an unidirectional viewing glass located at a light incident side of the transparent display panel and disposed to be opposite to the transparent display panel, wherein the unidirectional viewing glass comprises a glass plate and a coating film formed on a surface of the glass plate at a side thereof,
wherein, the unidirectional viewing glass is configured as a mirror when viewed from a side of the unidirectional viewing glass with a higher brightness to another side of the unidirectional viewing glass with a lower brightness, and configured as a transparent glass when viewed from a side of the unidirectional viewing glass with a lower brightness to another side of the unidirectional viewing glass with a higher brightness.

2. The transparent display device of claim 1 further comprising a light source disposed between the transparent display panel and the unidirectional viewing glass.

3. The transparent display device of claim 2, wherein the coating film covers an entire surface of the glass plate.

4. The transparent display device of claim 2, wherein the coating film comprises a first film layer covering the surface of the glass plate at a side thereof and a second film layer located at a side of the first film layer facing away from the glass plate; the second film layer has hollowed-out structures in one-to-one correspondence with the light transmitting regions of the transparent display panel.

5. The transparent display device of claim 4, wherein the first film layer has a thickness of 2700~3300 Å, and the second film layer has a thickness larger than or equal to 18000 Å.

6. The transparent display device of claim 5, wherein the first film layer has a thickness of 3000 Å, and the second film layer has a thickness of 20000 Å.

7. The transparent display device of claim 2, wherein the transparent display panel comprises a plurality of pixel units arranged in an array, each of the pixel units comprises:
a red sub-pixel unit, a green sub-pixel unit, and a blue sub-pixel unit which are configured for displaying so as to form the display region; and
a white sub-pixel unit configured for transmitting light so as to form the light transmitting region;
wherein, the coating film has hollowed-out structures in one-to-one correspondence with the white sub-pixel units.

8. The transparent display device of claim 2, wherein the coating film is an aluminum film or a silver film.

9. The transparent display device of claim 1, wherein the coating film covers an entire surface of the glass plate.

10. The transparent display device of claim 9, wherein the coating film is an aluminum film or a silver film.

11. The transparent display device of claim 1, wherein the coating film comprises a first film layer covering the surface of the glass plate at a side thereof and a second film layer located at a side of the first film layer facing away from the glass plate; the second film layer has hollowed-out structures in one-to-one correspondence with the light transmitting regions of the transparent display panel.

12. The transparent display device of claim 11, wherein the first film layer has a thickness of 2700~3300 Å, and the second film layer has a thickness larger than or equal to 18000 Å.

13. The transparent display device of claim 12, wherein the first film layer has a thickness of 3000 Å, and the second film layer has a thickness of 20000 Å.

14. The transparent display device of claim 13, wherein the coating film is an aluminum film or a silver film.

15. The transparent display device of claim 12, wherein the coating film is an aluminum film or a silver film.

16. The transparent display device of claim 11, wherein the coating film is an aluminum film or a silver film.

17. The transparent display device of claim 1, wherein the transparent display panel comprises a plurality of pixel units arranged in an array, each of the pixel units comprises:
a red sub-pixel unit, a green sub-pixel unit, and a blue sub-pixel unit which are configured for displaying so as to form the display region; and
a white sub-pixel unit configured for transmitting light so as to form the light transmitting region;

wherein, the coating film has hollowed-out structures in one-to-one correspondence with the white sub-pixel units.

18. The transparent display device of claim 17, wherein the coating film is an aluminum film or a silver film.

19. The transparent display device of claim 1, wherein the coating film is an aluminum film or a silver film.

* * * * *